United States Patent [19]
Engel

[11] Patent Number: 5,850,798
[45] Date of Patent: Dec. 22, 1998

[54] CAT-BOX LINER

[76] Inventor: Eric M. Engel, 481 W. 22nd St., Apt. 1, New York, N.Y. 10011

[21] Appl. No.: 941,181

[22] Filed: Sep. 30, 1997

[51] Int. Cl.[6] ............................ A01K 1/015; A01K 29/00
[52] U.S. Cl. .............................................. 119/170
[58] Field of Search ....................... 119/169, 170

[56] References Cited

U.S. PATENT DOCUMENTS

| | | |
|---|---|---|
| 3,416,495 | 12/1968 | Wilson . |
| 3,978,818 | 9/1976 | Heldenbrand ............ 119/170 |
| 4,469,046 | 9/1984 | Yananton . |
| 4,640,225 | 2/1987 | Yananton . |
| 4,756,273 | 7/1988 | Yananton . |
| 4,774,907 | 10/1988 | Yananton . |
| 4,800,677 | 1/1989 | Mack . |
| 4,800,841 | 1/1989 | Yananton et al. . |
| 4,813,374 | 3/1989 | Sides . |
| 4,819,580 | 4/1989 | Foldes . |
| 4,836,141 | 6/1989 | Whitfield . |
| 4,840,140 | 6/1989 | Yananton et al. . |
| 4,848,247 | 7/1989 | Kuipers .................. 108/52.1 |
| 4,852,518 | 8/1989 | Yananton . |
| 4,869,204 | 9/1989 | Yananton . |
| 4,934,316 | 6/1990 | Mack . |
| 5,006,379 | 4/1991 | Paciullo .................. 428/35.2 |
| 5,025,752 | 6/1991 | Yananton ................. 119/169 |
| 5,158,199 | 10/1992 | Pontius ................... 220/410 |
| 5,249,549 | 10/1993 | Rockaitis, III ........... 119/165 |
| 5,482,007 | 1/1996 | Kumlin .................. 119/169 |
| 5,551,106 | 9/1996 | Schacht et al. ............ 5/99.1 |
| 5,630,376 | 5/1997 | Ochi et al. .............. 119/169 |

OTHER PUBLICATIONS

Elrod, "Cat Litter Box Liner," U.S. Design Patent 313,292, issued Dec. 25, 1990.

*Primary Examiner*—Robert P. Swiatek
*Attorney, Agent, or Firm*—Charles E. Bruzga

[57] ABSTRACT

A liner for a cat box having sides extending upwardly from a bottom to a vertical height. The liner comprises a bag for placement in the cat box. The bag comprises a bottom portion for lining the cat box, and a contiguous top portion. A fluid-impermeable layer is placed within the box, located within the bottom portion of the bag and bonded to the bag. A sorbent layer is placed above the fluid-impermeable layer. A claw-resistant layer is placed above the sorbent layer and affixed to the fluid-impermeable layer so as to stiffen the affixed layers, whereby they tend to stay in place in the cat box. The top portion of the bag drapes over the sides of the box for a drape length and provides ballast for helping the liner to stay in place.

29 Claims, 5 Drawing Sheets

CAT-BOX LINER

FIELD OF THE INVENTION

The present invention relates to liners for boxes used for collection of cat urine and feces.

BACKGROUND OF THE INVENTION

A proliferation of liners have been proposed for use in boxes used for collection of cat urine and feces ("cat boxes"). Some employ the use of a fluid-impermeable first layer for lining the cat box, a sorbent second layer smaller than the first layer, positioned atop the first layer at least in the bottom of the box, and a claw-resistant third layer atop the sorbent layer and bonded to a peripheral region of the first layer. Such a liner, however, typically requires initial adhering to the cat box by the use of adhesives, for instance, and must be done in a fairly precise manner. This is a somewhat tedious, but not unpleasant, task. In contrast, the task of detaching the liner from the box when the liner has become soiled from cat urine and feces is not only tedious, but unpleasant owing to the odors of cat urine and feces.

Alternatively, a cat-box liner may be specially configured to achieve a stretch fit to the corners of a cat box. This require special manufacturing steps to accomplish, and typically results in a liner suited for use with cat boxes in a fairly narrow range of dimensions.

SUMMARY OF THE INVENTION

An exemplary embodiment of the invention provides a liner for a cat box having sides extending upwardly from a bottom to a vertical height. The liner comprises a bag for placement in the cat box. The bag comprises a bottom portion for lining the cat box, and a contiguous top portion. A fluid-impermeable layer is placed within the box, located within the bottom portion of the bag and bonded to the bag. A sorbent layer is placed above the fluid-impermeable layer. A claw-resistant layer is placed above the sorbent layer and affixed to the fluid-impermeable layer so as to stiffen the affixed layers, whereby they tend to stay in place in the cat box. The top portion of the bag drapes over the sides of the box for a drape length and provides ballast for helping the liner to stay in place.

The foregoing cat-box liner accommodates cat boxes with a broad range of dimensions. It can be installed and removed easily. Because it can be removed quickly, the unpleasant nature of its removal is minimized.

DESCRIPTION OF THE DRAWINGS

In the drawings, in which like reference numerals refer to like parts.

DETAILED DESCRIPTION OF THE INVENTION

Figure 1:
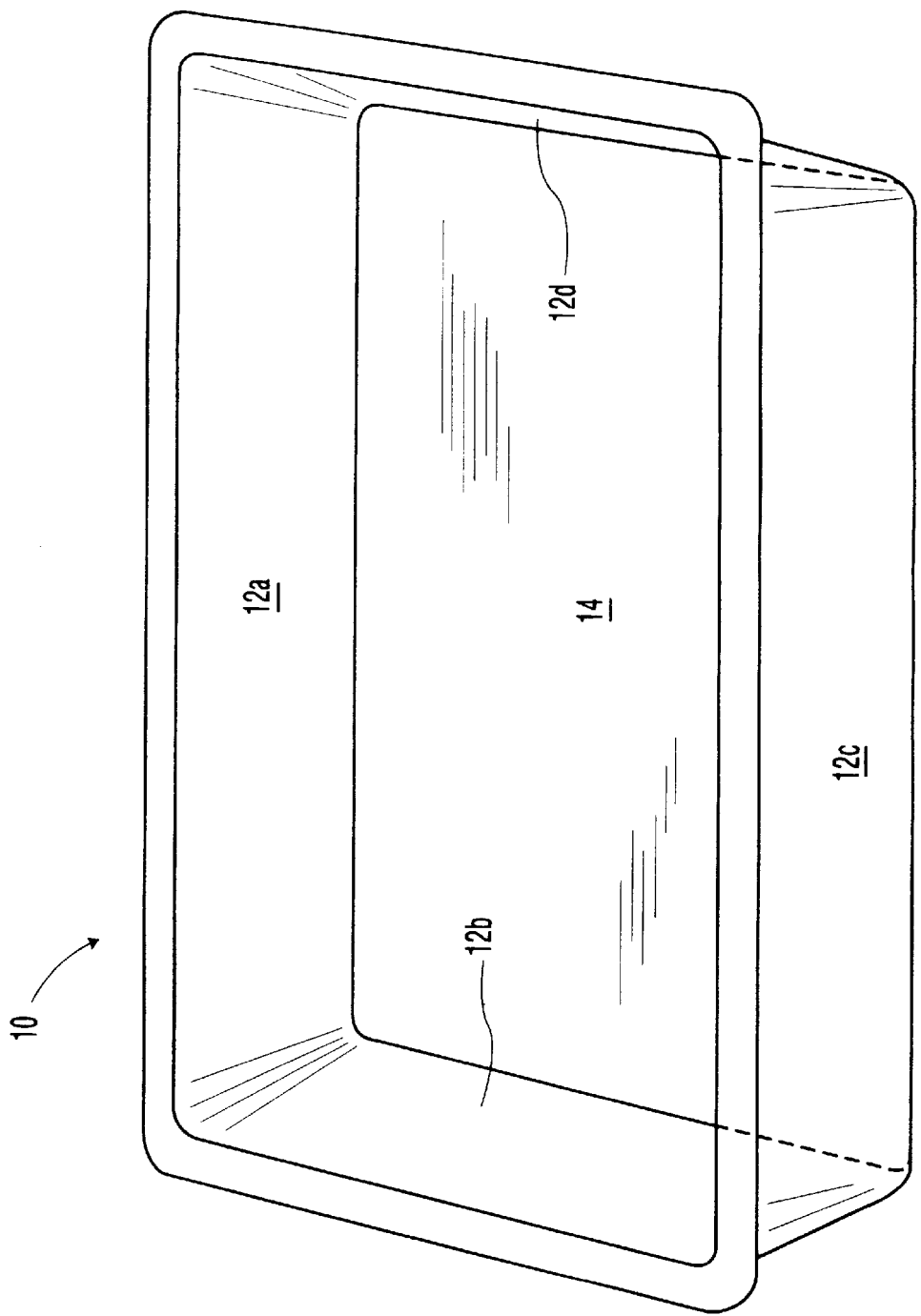
FIG. 1 is a perspective view of a typical cat box.
Figure 2:
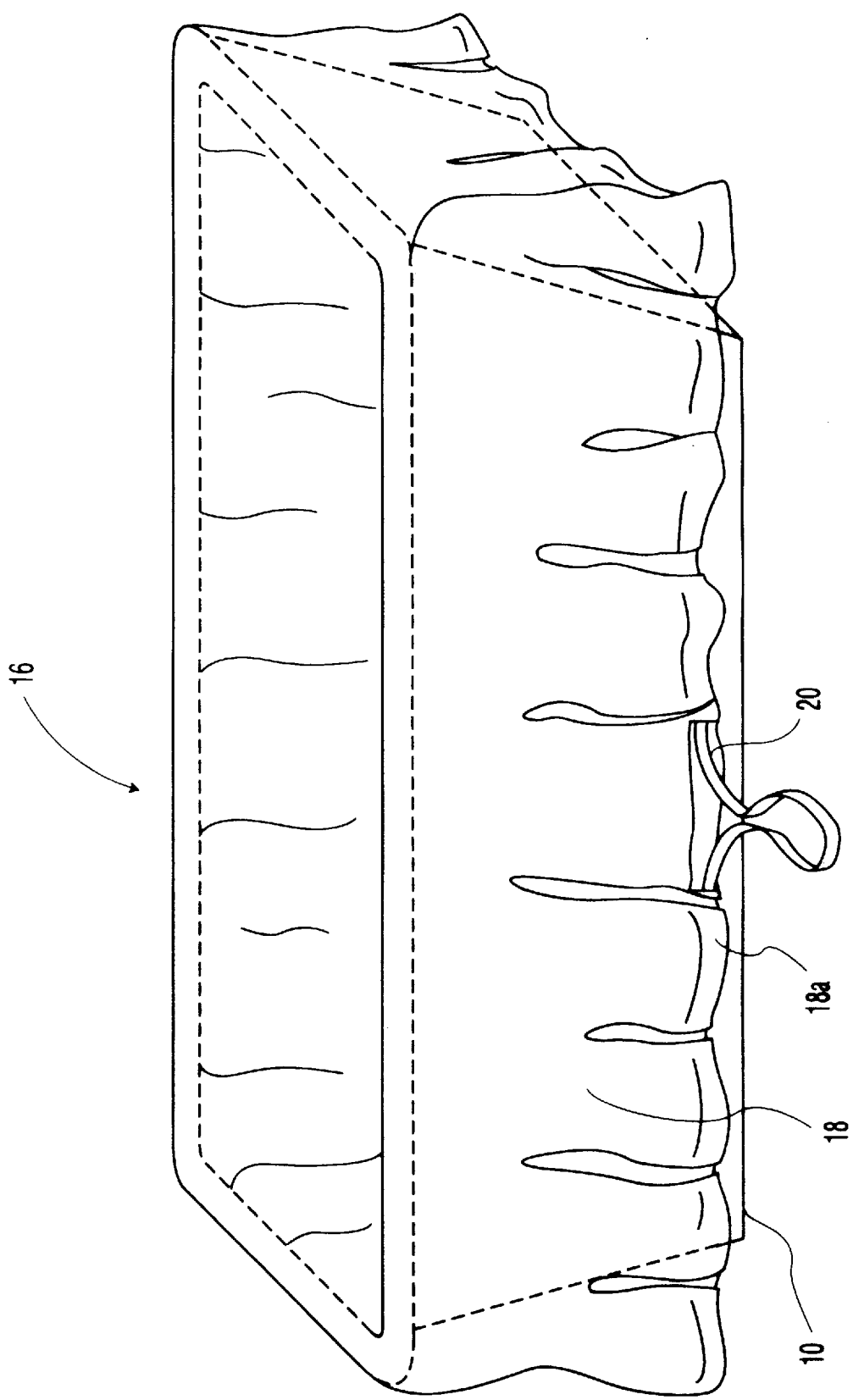
FIG. 2 is a perspective view of a cat-box liner positioned atop the cat box of FIG. 1.

FIG. 1 shows a typical cat box 10 for collecting the urine and feces of a cat. Box 10 has sides 12a, 12b, 12c and 12d extending to a vertical height above a bottom 14. FIG. 2 shows a cat-box liner 16 of the present invention in position on box 10. It includes an outer bag whose top portion 18 drapes over the sides of the box. As shown, the top portion includes a drawstring 20, partially contained within a tubular sleeve 18a. Although not shown, the opposite side of tubular sleeve 18a preferably has an opening for access to another portion of the drawstring.

Figure 3:
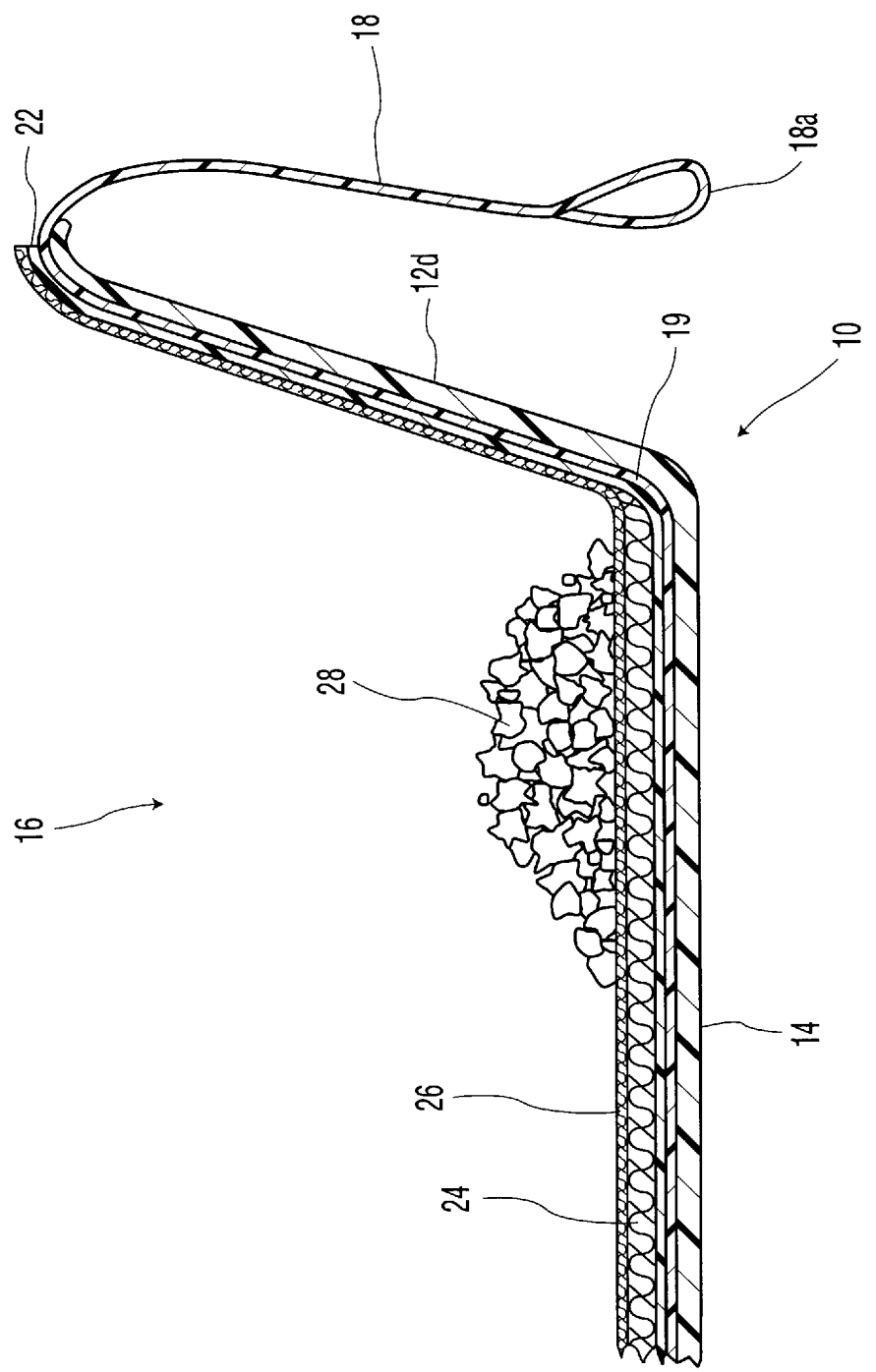
FIG. 3 is a side sectional view of a portion of the cat box with the liner installed.

FIG. 3 shows a portion of a portion of cat box 10, with liner 16 installed in the box. A bottom portion 19 of the outer bag preferably rests directly on the inside of box 10, and adjoins top portion 18 of the bag at the top of side 12d of the box, for instance. A fluid-impermeable layer 22 is positioned preferably directly atop bag portion 19. The upper, e.g., 2 to 6 centimeter peripheral portion of layer 22 is preferably attached to bag portion 19 by glue or heat sealing. Preferably, the sealing is substantially fully around a peripheral region of layer 22. A sorbent layer 24, which may be conventional per se, is placed above layer 22. It preferably covers at least the bottom of box 10 and extends slightly upwards at the sides of the box. It preferably absorbs urine and distributes it to facilitate rapid evaporation of its moisture content. It may be overlain by a layer (not shown) of a durable, non-woven tissue substance. A fluid-permeable, claw-resistant layer 26, which may be conventional per se, is positioned above sorbent layer 24 and any tissue layer (not shown). It is affixed to layer 22 in a majority of 3-centimeter (or 1.5 centimeter) squares of areas of adjacency of the layers, preferably directly or through an intermediate layer. This results in stiffening of the affixed layers so that they tend to stay in place in the box. It may also be affixed to the sorbent layer. A preferred bonding of layer 26 to layer 22 is heat-induced bonding in thin parallel strips (e.g., under 1 millimeter) spaced apart by about one centimeter. Cat litter 28 may be placed atop liner 16 for collection of cat feces. Preferably, fresh cat litter is provided with the liner, to even further simplify the task of collecting and disposing of cat wastes.

As can be seen in FIGS. 2 and 3, top portion 18 of the outer bag drapes over the sides of the cat box. Preferably it drapes substantially straight downwardly. By so draping, top portion 18 provides ballast, or weight, for helping liner 16 stay in place in the box. Preferably, the length of draping is more than half the vertical height of the sides; more preferably, it is more than three-quarters the vertical height; and still more preferably it is substantially the full vertical height of the sides.

Referring to FIG. 3, with top portion 18 draping as just described, a single size of outer bag can accommodate cat boxes of different dimensions where fluid-impermeable layer 22 extends sufficiently up the sides of a cat box, e.g, typically 6 to 10 centimeters, to prevent fluid from reaching the cat box.

Figure 4:
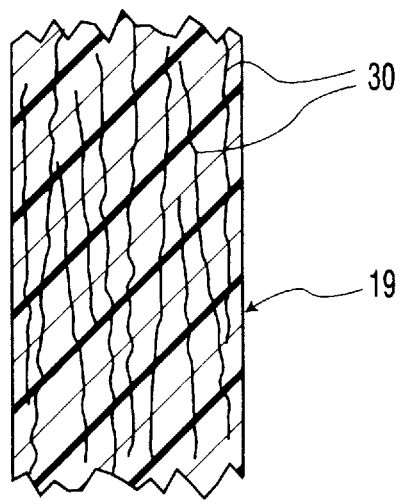
FIG. 4 is an enlarged, fragmentary, cross-sectional view of one form of an outer bag used in the invention.

To further stiffen liner 16, the outer bag can be reinforced in its construction with fibers contained within a flexible matrix of plastic, for instance. Referring to FIG. 4, such reinforcing fibers are shown at 30 in bag portion 19. The fibers may be made of woven or unwoven synthetic materials, such as nylon, or natural materials.

The stiffness of the inventive liner arising from the various aspects of its construction described above helps keep the liner in place in a cat box. This is advantageous whether or not the box is used with an additional cover (not shown), such as may be placed atop the sides of the cat box. The inventive liner more readily stays in place during the process of placing a cover on the box.

Figure 5:
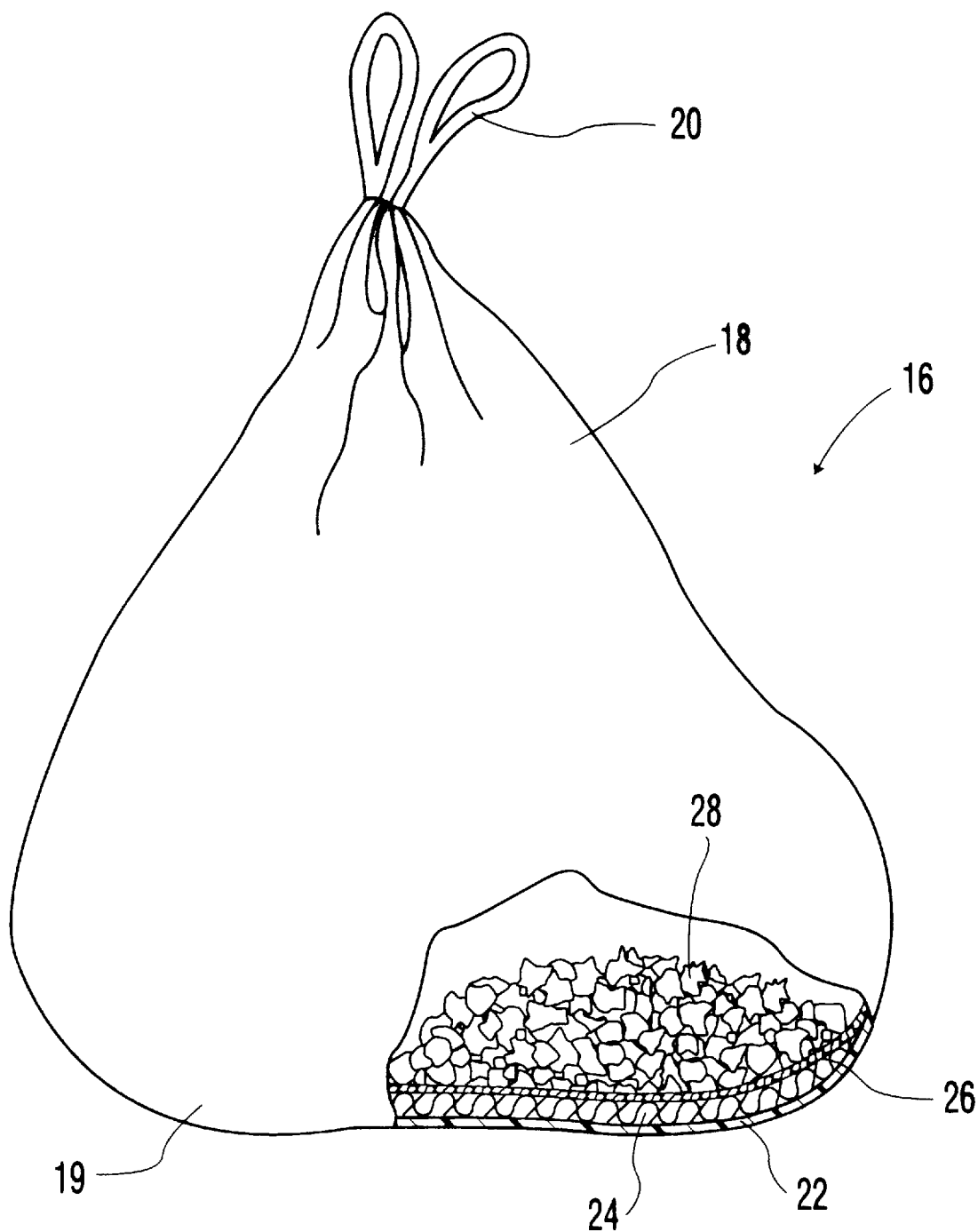
FIG. 5 is a side view of the liner in a suitable state for discarding after removal from a cat box.

FIG. 5 shows a cat box liner 16 removed from the cat box, and with the drawstring 20 of the bag tightened. This allows very quick removal of the liner and its contents, with great ease and with little likelihood of spilling the contents of the liner (e.g., dirty cat litter). It is preferred that top portion 18 be long, as described above. This facilitates complete closure of the bag as shown in FIG. 5. To the contrary, with top portion 18 having a short length, it has been found that the bag cannot easily be completely closed at the top.

In more detail, fluid-impermeable layer 22 may comprise a thin sheet of plastic material, such as polypropylene or polyethylene. Sorbent layer 24 may comprise, for instance, the sorbent material described in U.S. Pat. No. 4,117,184. Claw-resistant layer 26 may comprise, for instance, strands of polyester or polypropylene, which collectively achieve structural integrity through bonding at the intersections of the strands. Especially for hydrophobic materials, a surfactant is preferably used to assure that layer 26 is permeable or semi-permeable to liquid. Bag 18 preferably comprises thin plastic material, which may incorporate fibers as described in connection with FIG. 4.

While the invention has been described with respect to specific embodiments by way of illustration, many modifications and changes will occur to those skilled in the art. It is, therefore, to be understood that the appended claims are intended to cover all such modifications and changes as fall within the true scope and spirit of the invention.

What is claimed is:

1. A liner for a cat box having sides extending upwardly from a bottom to a vertical height, said liner comprising:
   (a) a bag for placement in a cat box, said bag comprising:
      (i) a bottom portion for lining the cat box;
      (ii) a contiguous top portion; and
      (iii) a main, closable opening in said bag located at a periphery of said top portion distal from said bottom portion, along a surface of said bag;
   (b) a fluid-impermeable layer for placement within the box, being located within said bottom portion of said bag and being bonded about substantially its entire periphery to said bag;
   (c) a sorbent layer for placement above said fluid-impermeable layer; and
   (d) a claw-resistant layer above said sorbent layer and affixed to said fluid-impermeable layer so as to stiffen the affixed layers whereby they tend to stay in place in the cat box;
   (e) said fluid-impermeable layer having an area larger than that of said sorbent layer, and being placed adjacent said bag bottom portion without the interposition of a sorbent layer or claw-resistant layer between them;
   (f) said top portion of said bag being for draping over the sides of the box for a drape length and providing ballast for helping the liner to stay in place.

2. The liner of claim 1, wherein said top portion of said bag is for draping over the sides of the box substantially straight downwardly.

3. The liner of claim 1, wherein said drape length is more than half the vertical height of said sides.

4. The liner of claim 1, wherein said drape length is more than three-fourths the vertical height of said sides.

5. The liner of claim 1, wherein said drape length is substantially the full vertical height of said sides.

6. The liner of claim 1, wherein said claw-resistant layer is affixed directly to said fluid-impermeable layer.

7. The liner of claim 1, wherein said claw-resistant layer is affixed to said fluid-impermeable layer in a majority of 3-centimeter squares of areas of adjacency of said layers.

8. The liner of claim 1, wherein said claw-resistant layer is affixed to said fluid-impermeable layer in a majority of 1.5-centimeter squares of areas of adjacency of said layers.

9. The liner of claim 1, wherein the topmost portion of said bag includes a drawstring.

10. The liner of claim 1, wherein said fluid-impermeable layer is bonded to said bag around the upper periphery of said fluid-impermeable layer.

11. The liner of claim 10, wherein said fluid-impermeable layer is bonded to said bag substantially fully around a peripheral region of said fluid-impermeable layer.

12. The liner of claim 1, wherein:
   (a) said bag has a center with respect to said opening along a surface of said bag; and
   (b) said sorbent layer is approximately aligned with said center of said bag.

13. The liner of claim 1, wherein said top portion of said bag provides ballast for helping the liner stay in place without adhering the bag to the box.

14. The liner of claim 1, wherein said top portion of said bag provides ballast for helping the liner stay in place without requiring additional fastening elements.

15. A liner for a cat box having sides extending upwardly from a bottom to a vertical height in combination with fresh cat litter, said combination comprising:
   (a) a bag for placement in a cat box, said bag comprising:
      (i) a bottom portion for lining the cat box; and
      (ii) a contiguous top portion;
      (iii) a main, closable opening in said bag located at a periphery of said top portion distal from said bottom portion, along a surface of said bag; and
      (iv) said bag having a center with respect to said opening along a surface of said bag;
   (b) a fluid-impermeable layer for placement within the box, being located within said bottom portion of said bag and being bonded about substantially its entire periphery to said bag;
   (c) a sorbent layer for placement above said fluid-impermeable layer;
   (d) a claw-resistant layer above said sorbent layer and affixed to said fluid-impermeable layer so as to stiffen the affixed layers whereby they tend to stay in place in the cat box;
   (e) said fluid-impermeable layer having an area larger than that of said sorbent layer, and being placed adjacent said bag bottom portion without the interposition of a sorbent layer or claw-resistant layer between them;
   (f) said top portion of said bag being for draping over the sides of the box for a drape length and providing ballast for helping the liner to stay in place; and
   (g) fresh cat litter contained in said liner.

16. A liner for a cat box having sides extending upwardly from a bottom to a vertical height, said liner comprising:
   (a) a bag for placement in a cat box, said bag comprising:
      (i) a bottom portion for lining the cat box;
      (ii) a contiguous top portion; and
      (iii) a main, closable opening in said bag located at a periphery of said top portion distal from said bottom portion, along a surface of said bag;
   (b) a fluid-impermeable layer for placement within said box, being located within said bottom portion of said bag and being bonded about substantially its entire periphery to said bag;
   (c) a sorbent layer for placement above said fluid-impermeable layer; and (d) a claw-resistant layer above said sorbent layer and affixed to said fluid-impermeable layer so as to stiffen the affixed layers whereby they tend to stay in place in said cat box;

(f) said fluid-impermeable layer having an area larger than that of said sorbent layer, and being placed adjacent said bag bottom portion without the interposition of a sorbent layer or claw-resistant layer between them; and (g) said top portion of said bag being for draping over the sides of said box in such manner that said periphery of said top portion surrounds the entire horizontal periphery of the box;

(h) said top portion of said bag being for draping over the sides of said box for a drape length and providing ballast for helping the liner to stay in place without adhering the bag to the box.

17. The liner of claim 13, wherein said top portion of said bag is for draping over the sides of the box substantially straight downwardly.

18. The liner of claim 16, wherein said drape length is more than half the vertical height of said sides.

19. The liner of claim 16, wherein said drape length is more than three-fourths the vertical height of said sides.

20. The liner of claim 16, wherein said drape length is substantially the full vertical height of said sides.

21. The liner of claim 16, wherein said claw-resistant layer is affixed directly to said fluid-impermeable layer.

22. The liner of claim 16, wherein said claw-resistant layer is affixed to said fluid-impermeable layer in a majority of 3-centimeter squares of areas of adjacency of said layers.

23. The liner of claim 16, wherein said claw-resistant layer is affixed to said fluid-impermeable layer in a majority of 1.5-centimeter squares of areas of adjacency of said layers.

24. The liner of claim 16, wherein the topmost portion of said bag includes a drawstring.

25. The liner of claim 16, wherein said fluid-impermeable layer is bonded to said bag around the upper periphery of said fluid-impermeable layer.

26. The liner of claim 25, wherein said fluid-impermeable layer is bonded to said bag substantially fully around a peripheral region of said fluid-impermeable layer.

27. The liner of claim 16, wherein:
(a) said bag has a center with respect to said opening along a surface of said bag; and
(b) said sorbent layer is approximately aligned with said center of said bag.

28. The liner of claim 16, wherein said top portion of said bag provides ballast for helping the liner stay in place without requiring additional fastening elements.

29. The liner of claim 16, wherein said bag comprises a sheet of flexible material reinforced with fiber so as to stiffen the bag and cause it to tend to stay in place in the box.

* * * * *